US010820211B1

(12) United States Patent
Bashir

(10) Patent No.: US 10,820,211 B1
(45) Date of Patent: Oct. 27, 2020

(54) SPECTRUM BAND TRANSITION MANAGEMENT SYSTEM

(71) Applicant: T-Mobile USA, Inc., Bellevue, WA (US)

(72) Inventor: Shahzad Bashir, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/712,871

(22) Filed: Dec. 12, 2019

(51) Int. Cl.
*H04W 40/00* (2009.01)
*H04W 16/14* (2009.01)
*H04W 16/18* (2009.01)
*G06Q 30/00* (2012.01)

(52) U.S. Cl.
CPC .......... *H04W 16/14* (2013.01); *H04W 16/18* (2013.01); *G06Q 30/018* (2013.01)

(58) Field of Classification Search
CPC ..... H04W 24/00; H04W 24/02; H04W 24/08; H04W 88/08; H04W 16/18; H04W 16/24; H04W 16/02; H04W 16/12; H04W 16/32; H04W 28/16
USPC ............... 455/446, 447, 67.11, 424
See application file for complete search history.

(56) References Cited

U.S. PATENT DOCUMENTS

| 8,831,625 | B2 * | 9/2014 | Joslyn | H04W 24/08 370/252 |
| 2015/0163671 | A1 * | 6/2015 | Stanforth | H04W 16/14 455/411 |
| 2015/0189682 | A1 * | 7/2015 | Carbajal | H04W 28/16 455/509 |
| 2018/0332582 | A1 * | 11/2018 | Bashir | H04W 16/14 |

\* cited by examiner

*Primary Examiner* — Temica M Beamer
(74) *Attorney, Agent, or Firm* — Knobbe Martens Olson & Bear LLP

(57) ABSTRACT

Systems and methods are described for managing usage of wireless network equipment in a spectrum band that is in the process of being cleared. A regulatory agency may repurpose spectrum bands and define a transition period during which current or former licensees must vacate the band. A new licensee may begin using the spectrum band subject to various regulations in effect during the transition period, such as a requirement that the new licensee not interfere with current or former licensees that have not yet vacated. A spectrum band transition management system may thus be used to manage wireless network equipment and spectrum usage during the transition period. The spectrum band transition management system allows the new licensee to track potential interference sources and their vacate dates, mitigate interference sent and received during the transition period, and engineer a network that makes efficient use of spectrum during and after the transition.

20 Claims, 4 Drawing Sheets

SPECTRUM BAND TRANSITION MANAGEMENT SYSTEM

BACKGROUND

Generally described, cellular telecommunications network operators may provide telecommunications services for mobile devices by transmitting and receiving radio signals at various frequencies. A cellular telecommunications network operator may obtain a license from a regulatory agency, such as the Federal Communications Commission, to make use of a particular set of frequencies in a particular geographic area. The set of frequencies made available to the licensee may be defined in terms of the electromagnetic spectrum, and may typically be referred to as a spectrum band.

Regulatory agencies may allocate spectrum bands to licensees for various purposes, including cellular telecommunications, television broadcasts, emergency services, air-to-ground communication, and so forth. Regulatory agencies may also allocate spectrum bands for unlicensed use, such as the spectrum made available for Wi-Fi networks or citizens' band radios. On occasion, regulatory agencies may reclaim a previously allocated spectrum band and then allocate it to a different licensee for a different purpose. For example, a regulatory agency may reclaim a spectrum band that was previously allocated to licensed television broadcasters and unlicensed wireless microphone systems, and may re-allocate and license the spectrum band to operators of cellular telecommunications networks.

When re-purposing a spectrum band, the regulatory agency may specify a transition period during which previously licensed users may continue using the spectrum band, with the expectation that they will cease to do so (and, potentially, migrate or "repack" to a different spectrum band) by the end of the transition period. The regulatory agency may further specify that the new licensee may begin using the spectrum band provided that its usage does not interfere with previously licensed users that have not yet vacated the band, and may still further specify that unlicensed users must vacate the spectrum band upon request of the new licensee.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
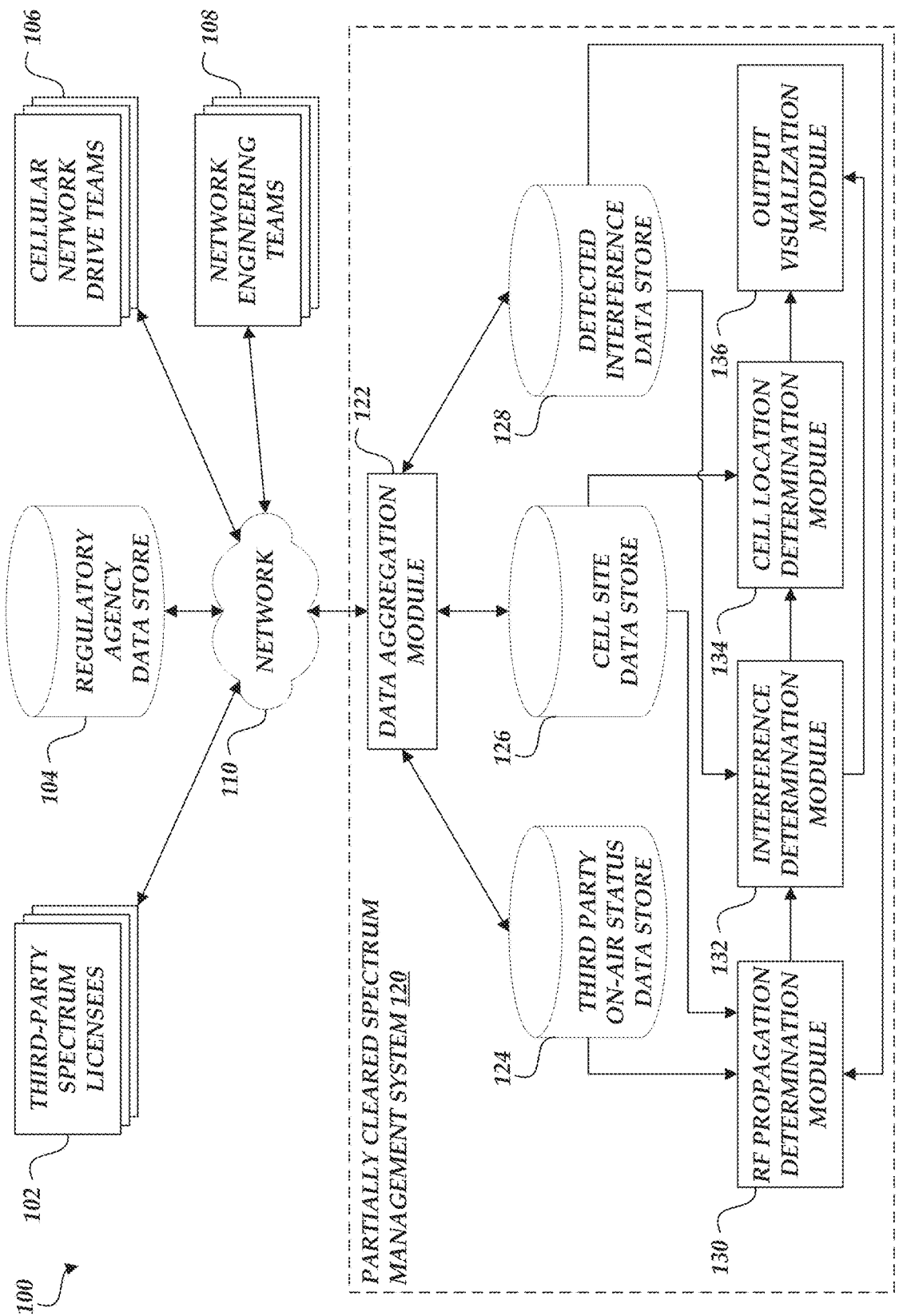
FIG. 1 is a functional block diagram of an example network environment for implementing a spectrum band transition management system in accordance with aspects of the present disclosure.

Generally described, aspects of the present disclosure relate to wireless telecommunications. More specifically, aspects of the present disclosure are directed to systems, methods, and computer-readable media related to a spectrum band transition management system. A spectrum band transition management system may be used to facilitate efficient usage of a spectrum band that is only partially cleared of interference sources, and that changes over time with regard to the on-air status of interference sources. As an illustrative example, a wireless network operator may be licensed by a regulatory agency to operate in a particular spectrum band, such as the band of frequencies from 614 MHz to 698 MHz (the "600 MHz band"). The spectrum band may have been reclaimed by the regulatory agency from licensees who had used it for other purposes, such as terrestrial television broadcasts in the Ultra High Frequency ("UHF") range. All or part of the spectrum band may also have been allocated for unlicensed uses, such as wireless microphone systems. The regulatory agency may specify a transition period during which previously licensed and unlicensed users of the spectrum (which may be referred to collectively herein as "transition period users") are permitted to continue using the spectrum subject to certain regulations. For example, the regulatory agency may require that licensed users specify a "repack" or "vacate" date upon which they will cease operating in the spectrum band. As a further example, a regulatory agency may require that unlicensed users vacate the spectrum band upon request of the new licensee, either immediately or after a timely or predetermined time interval.

The regulatory agency may further permit the new licensee to begin operating in the spectrum band subject to certain requirements, such as a requirement that the new licensee not interfere with the operations of the previous licensees during the transition period. The new licensee may thus be unable to use all or part of the spectrum band during the transition period. However, the new licensee may be unable to use the spectrum band efficiently during the transition period, since using the band efficiently may require deploying equipment such as radio transceivers and antennas, and these equipment may cause interference to the previous licensees.

To address these issues and make efficient use of newly licensed spectrum, a wireless network operator may implement a partially cleared spectrum management system as described herein. The partially cleared spectrum management system may enable the wireless network operator to, for example, better plan the deployment of network equipment, make better use of partially cleared spectrum during the transition period, and better track interference sources and progress toward clearing the spectrum. For example, the partially cleared spectrum management system may enable the wireless network operator to determine locations for base stations and other network equipment that minimize interference during the transition period but support long-term use of the spectrum after the transition. As a further example, the partially cleared spectrum management system may be used to determine schedules for deploying network equipment, such that deployments of base stations (or, in some embodiments, deployments of additional radios into existing base stations) are prioritized according to when the newly licensed spectrum can be used within the coverage area of the base station without causing or receiving interference.

In some embodiments, the partially cleared spectrum management system may generate and present user interfaces that facilitate spectrum management. For example, the partially cleared spectrum management system may generate maps of the area in which the new spectrum is licensed, and may highlight the areas where transition period users are expected to be generating interference at a particular point in time. In further embodiments, the user interfaces may enable viewing information about transition period users, such as the repack dates that they have provided to the regulatory agency or to the wireless network operator. As a further example, the partially cleared spectrum management system may generate maps that show potential locations for cell sites, and may show whether these locations would be subject to interference from transition period users or would cause interference to previous licensees at various times during the transition period.

It will be understood that the partially cleared spectrum management system described herein addresses a technical problem that specifically arises in the realm of wireless telecommunications networks, and in particular addresses a problem that prevents the efficient use of partially cleared spectrum. It will further be understood that the technical problem described herein is not analogous to any pre-Internet practice, and that the partially cleared spectrum management system improves the performance of wireless telecommunications networks by reducing interference and enabling usage of newly licensed spectrum during a transition period. A wireless network operator may thus make more effective use of licensed spectrum and provide wireless telecommunications services more efficiently by implementing a partially cleared spectrum management system.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the disclosures herein described.

FIG. 1 is a block diagram of an example network environment 100 for implementing a partially cleared spectrum management system 120 in accordance with aspects of the present disclosure. It will be understood that the network environment 100 may include more (or fewer) elements than those shown in FIG. 1. It is not necessary, however, that all of these elements be shown in order to provide an enabling disclosure.

In the illustrated embodiment, the network environment 100 includes a number of third-party spectrum licensees 102, who communicate with a regulatory agency data store 104 and a partially cleared spectrum management system 120 via a network 110. The network environment 100 further includes cellular network drive teams 106 and network engineering teams 108, which also communicate with the partially cleared spectrum management system 120 via the network 110. In some embodiments, the third-party spectrum licensees 102 may communicate with an intermediary, who may in turn communicate with the partially cleared spectrum management system 120. For example, a wireless network operator may communicate with the third-party spectrum licensees 102 to request status updates or other information regarding the licensees' plans to vacate a spectrum band that has been reassigned from the third-party spectrum licensees 102 to the wireless network operator. The wireless network operator may then provide the obtained information to the partially cleared spectrum management system 120. In other embodiments, the partially cleared spectrum management system 120 may obtain information from the regulatory agency data store 104 rather than obtaining it directly or indirectly from the third-party spectrum licensees 102.

The third-party spectrum licensees 102 may generally be any currently licensed or formerly licensed users of a wireless spectrum band that has been repurposed. As described in more detail above, a wireless spectrum band may be repurposed by a regulatory agency, which may specify an end date by which existing licensees must cease using the spectrum band, and a start date by which a new licensee may begin using the spectrum band for a different purpose. In some embodiments, the end date and the start date may overlap, creating a transition period during which both the previous licensees and the new licensee are using the spectrum band.

The regulatory agency data store 104 may illustratively be any non-transitory computer-readable medium that stores information regarding the third-party spectrum licensees 102. Such information may include, for example, transmitter locations, transmit frequencies, transmit power, schedules for vacating the spectrum band, and other such information. In various embodiments, the regulatory agency data store 104 may be a website, database, calendar, table, or other compilation. In some embodiments, the partially cleared spectrum management system 120 may access the regulatory agency data store 104 via an application programming interface ("API") or other interface for accessing the data.

In some embodiments, cellular network drive teams 106 may collect data regarding interference sources within the partially cleared spectrum band at various locations within the geographic area associated with the license. For example, the cellular network drive teams 106 may identify unlicensed users of the spectrum band, or may measure the transmissions of licensed users (e.g., the third-party spectrum licensees 102) and determine whether, where, and how these transmissions will interfere with the wireless network operator's intended or actual use of the spectrum band. In some embodiments, the cellular network drive teams 106 may determine whether the wireless network operator's intended or actual use will interfere with the third-party spectrum licensees 102.

In some embodiments, the network engineering teams 108 of the wireless network operator may provide and maintain information regarding current and future use of the spectrum band. For example, the network engineering teams 108 may provide data regarding the locations of cell sites, their radio frequencies, and transmission strengths. As a further example, the network engineering teams 108 may provide data regarding subscriber locations, population densities, geographic terrain, or other information that may be useful in determining how the wireless network operator can make efficient use of the spectrum band.

The network 110 may illustratively be any wired or wireless network, or combination thereof. In addition, the network 110 may include, but is not limited to, a cellular telecommunications network, Wi-Fi network, cable network, satellite network, mesh network, personal area network, local area network (LAN), wide area network (WAN), public or private intranet, the Internet, or other public or private communications network or networks, or any combination thereof. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or some other type of wireless network. The network 110 may use protocols and components for communicating via the Internet or any of the other aforementioned types of networks. In some embodiments, the network 110 may be omitted, and one or more of the third-party spectrum licensees 102, regulatory agency data store 104, cellular network drive teams 106, or network engineering teams 108 may communicate with the partially cleared spectrum management system 120 or each other directly.

The illustrated network environment 100 further includes a partially cleared spectrum management system 120. The partially cleared spectrum management system 120, in turn, include a data aggregation module 122, third-party on-air status data store 124, cell site data store 126, detected interference data store 128, radio frequency propagation determination module 130, interference determination module 132, cell location determination module 134, and output visualization module 136, which may carry out various aspects of the present disclosure as described in more detail below. Illustratively, the data aggregation module 122 may obtain data from various sources (including, e.g., the third-party spectrum licensees 102, regulatory agency data store 104, cellular network drive teams 106, and network engineering teams 108), and may store the obtained data in the third-party on-air status data store 124, cell site data store 126, and detected interference data store 128 for use by the radio frequency propagation determination module 130, interference determination module 132, and cell location determination module 134.

Figure 2:
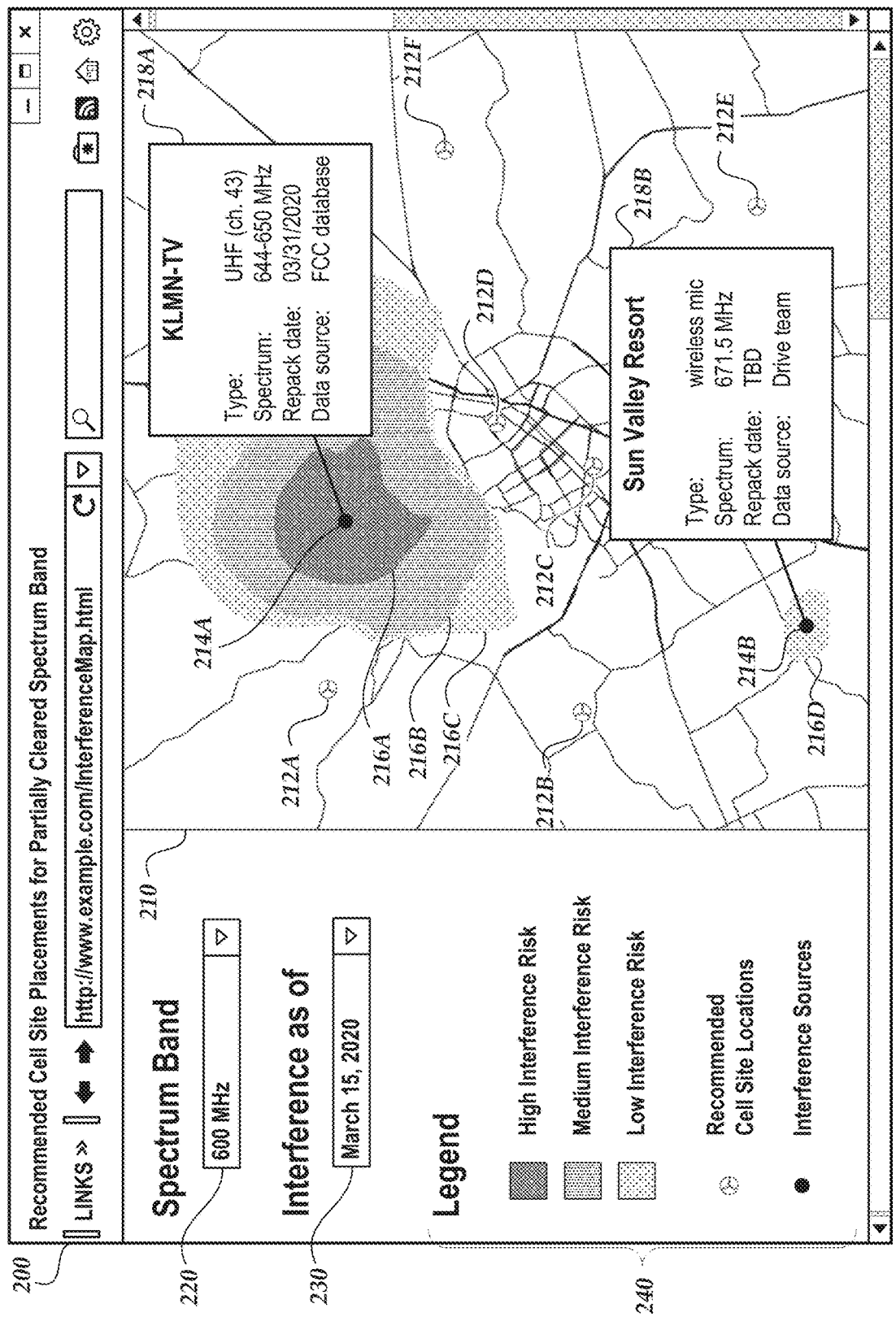
FIG. 2 is a pictorial diagram of an example user interface generated by a spectrum band transition management system in accordance with aspects of the present disclosure.

FIG. 2 is a pictorial diagram of an example user interface 200 that may be generated by a partially cleared spectrum management system 120 in accordance with aspects of the present disclosure. The user interface 200 may be generated, for example, by the output visualization module 136 depicted in FIG. 1. In the illustrated example, the user interface 200 includes a geographic map 210, which displays at least part of the geographic area in which the wireless network operator has obtained a license to partially cleared spectrum.

The map 210 includes a number of base stations 212A-F. In various embodiments, the base station locations 212A-F may represent existing base stations, potential locations for new base stations, or combinations thereof. In some embodiments, the base station locations 212A-F may be determined by a partially cleared spectrum management system 120 based on analyses of interference sources, interference recipients, and timeframes in which individual interference sources are expected to vacate the spectrum band. In further embodiments, the base station locations 212A-F may include existing cell sites that are capable of being upgraded to use the new spectrum band (e.g., by installing radios, antennas, filters, or other equipment), or that can be configured to utilize the spectrum band (e.g., by tuning existing radios to new frequencies or otherwise making use of existing equipment). In some embodiments, the base stations 212A-F may be omitted from the map 210. In some embodiments, the base stations 212A-F may be shaded or color coded to indicate the relative amount or risk level of interference received or caused.

The map 210 further includes a number of interference sources 214A-B, which generate interference in areas 216A-D (or, in some embodiments, would be susceptible to interference from base stations in these areas). In some embodiments, the areas 216A-D may be colored or shaded to indicate the relative amount of interference generated or the relative risk of interference if a cell site were placed in or near the affected area. For example, area 216A may be shaded to indicate a high risk of interference, area 216B may be shaded to indicate a medium risk of interference, and areas 216C and 216D may be shaded to indicate a low risk of interference. In some embodiments, colors or shadings may be used to display a continuous "heat map" of interference sources, or to indicate different levels of interference (e.g., interference sufficient to prevent voice calls). In further embodiments, unshaded areas of the map may indicate little to no risk of interference. In other embodiments, the areas 216A-D or the interference sources 214A-B may be colored, shaded, or otherwise tagged to indicate a duration until the interference source 214A-B vacates the spectrum, instead of or in addition to coloring or shading indicating interference risk.

The map 210 further includes interferer detail displays 218A-B, which display information regarding particular sources of interference. In some embodiments, the interferer detail displays 218A-B may be displayed when a user interacts with the map 210 (e.g., by hovering over, clicking, or tapping one of the interference sources 214A-B). The displayed information may include, for example, information regarding the type of interference (e.g., licensed or unlicensed, purpose for which the spectrum is being used, etc.), affected frequencies, interferer status, a date on which the interferer is expected to vacate the spectrum, or other information. In some embodiments, the user interface 200 may enable a user to input information, such as a name or contact details, which may then be displayed in the interferer detail displays 218A-B. Additionally, in some embodiments, the interferer detail displays 218A-B may indicate the source(s) of the displayed information. For example, the interferer detail displays 218B may indicate that all or part of the displayed information came from a cellular network drive team 106, which conducted a drive test in the area 214B on a particular date.

The user interface 200 may further include a spectrum band selector 220, date selector 230, and legend 240. The spectrum band selector 220 may enable the user to select different spectrum bands (or, in some embodiments, different sets of frequencies within a new or existing spectrum band) for which interference sources and potential cell site locations may be displayed. In some embodiments, the spectrum band selector 220 may enable a user to view the coverage areas associated with spectrum bands other than the newly licensed band that is undergoing a transition period, to facilitate determining which geographic areas may be in need of additional coverage or capacity. The date selector 230 may enable the user to select different dates during the transition period (or, in some embodiments, before or after the transition period), which may cause the map 210 to display the interference risks that are projected to exist as of the selected date. For example, in the illustrated embodiment, the map 210 displays interference sources 214A-B that are predicted to be at risk of causing or receiving interference in the geographic areas 216A-D as of Mar. 15, 2020. The legend 240 may display information regarding the colors, shades, and symbols displayed on the map 210.

It will be understood that FIG. 2 is provided for purposes of example, and that many variations on the depicted user interface 200 are within the scope of the present disclosure. For example, in some embodiments, the user interface 200 may allow interactive placement of cell sites on the map 210, and may display interference received or caused by different placements of cell sites. As a further example, the map 210 may display information regarding subscriber density, population density, coverage gaps, or other relevant data. Still further, in some embodiments, the user interface 200 may include controls, such as a slider or date picker, that enables a user to visually display predicted interference at different times during the transition period. FIG. 2 is thus understood to be illustrative and not limiting.

Figure 3:
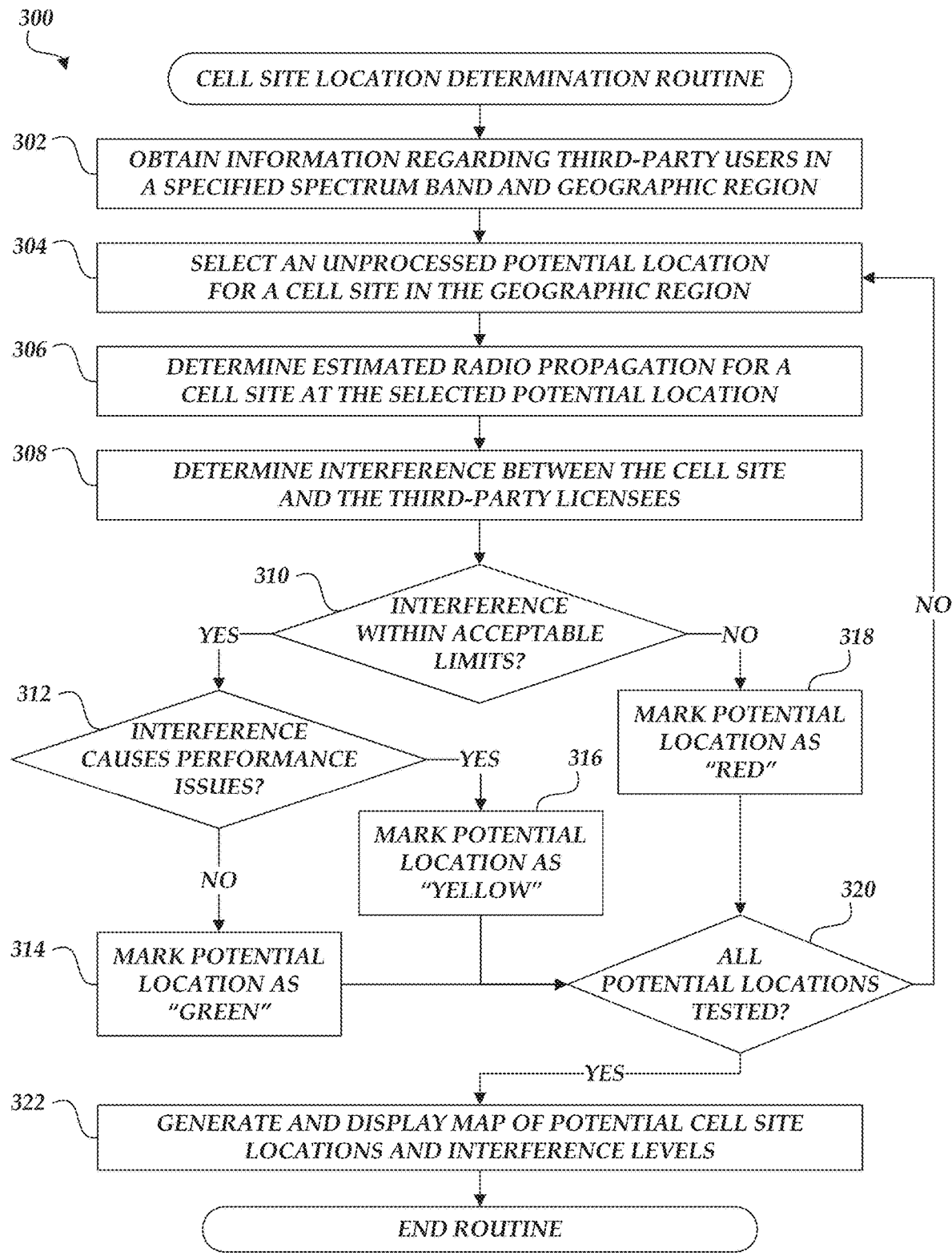
FIG. 3 is a flow diagram depicting an example interference determination routine that may be implemented by a spectrum band transition management system in accordance with aspects of the present disclosure.

FIG. 3 is a flow diagram depicting an example cell site location determination routine 300 in accordance with aspects of the present disclosure. The routine 300 may be carried out, for example, by the cell location determination module 134 depicted in FIG. 1. At block 302, information may be obtained regarding third-party users of a newly licensed spectrum band in a specified geographic region. The information may include, for example, license information regarding previous licensees, empirical data on interference sources collected by drive teams, information regarding plans to vacate the spectrum (e.g., repack dates, dates negotiated with unlicensed users), and the like. In some embodiments, the information may include data regarding the source of the information, when the information was collected, and so forth. In some embodiments, the information may include estimated propagations of third-party wireless transmitters. In other embodiments, the obtained information may enable determining estimated propagations for third-party wireless transmitters. For example, the information may include data regarding third-party antenna heights, transmission power levels, and the like. In further embodiments, estimated propagations of the third-party transmitters may be determined by the routine 300 or a routine that is carried out separately.

At block 304, an unprocessed potential cell site location may be selected. In some embodiments, a set of potential cell site locations may be provided as input to the routine 300, and each of the potential locations may be selected in turn. In other embodiments, the geographic region associated with the newly licensed spectrum may be systematically analyzed (e.g., by overlaying a grid of potential cell site locations). In further embodiments, some or all of the "potential" cell site locations may be existing cell sites that could potentially utilize the newly licensed spectrum.

At block 306, an estimated coverage area or estimated radio propagation for a cell site at the potential location may be determined. Illustratively, an estimated coverage area or estimated radio propagation for a cell site may be determined using computer simulations and statistical modeling techniques, which may take into account factors such as the height of the cell site's antenna above ground level, the effective radiated power ("ERP") of the antenna, the antenna pattern (i.e., the relative intensity of generated radio signals as a function of direction and distance from the antenna), terrain features (e.g., hills and valleys), buildings and other artificial barriers to radio wave propagation, and other factors. These models may generate a two-dimensional (e.g., at or a specified distance above ground level) or three-dimensional estimate of how far, and at what strength, radio signals will propagate from a cell site at the potential location. As estimated coverage area may then be determined within which the strength of the radio signals exceeds a threshold. In some embodiments, multiple estimated coverage areas may be determined for different types of cell sites at the same potential location, different antennas, or other variations. For example, a first estimated coverage area may be determined for a macrocell having a transmit power level of 46 decibel milliwatts ("dBm"), and a second estimated coverage area may be determined for a picocell having a transmit power level of 25 dBm. The determined estimated coverage area(s) may, in some embodiments, be an area in which the estimated signal strength received at a mobile device is estimated to exceed a threshold (e.g., the threshold at which the mobile device may use the signal to access wireless telecommunications services). In further embodiments, the estimated coverage area(s) may be determined as a range of signal strengths that fade with distance from the location. Still further, in some embodiments, the estimated coverage area(s) may be determined as a geographic area in which the signal strength relative to a noise floor exceeds a threshold.

At block 308, a determination may be made as to the amount of interference that is predicted to be received or generated by a cell site at the potential location with the radio propagation characteristics determined at block 306. Illustratively, the radio signal generated by a cell site may only be usable at a particular geographic location if a mobile device at that location can distinguish the signal from background noise, which may include other radio signals that are transmitted at the same frequency. A signal that would otherwise be usable may thus be unusable due to interference from another signal (e.g., a signal generated by a third-party user of the newly licensed spectrum) that prevents the cell site's signal from being received. Conversely, a cell site at the potential location may interfere with reception of third-party signals, which may violate the terms under which the new licensee may use the spectrum band during the transition period. The determination made at block 308 may thus include interference by a third party with the signals transmitted by a cell site at the potential location, interference by a cell site at the potential location with signals transmitted by a third party, or both. In some embodiments, the determination at block 308 may include a predicted performance of a cell site at the potential location, which may be characterized or expressed in terms of the predicted interference between the cell site and the third-party signals. For example, the predicted performance of the cell site may be described in terms of an S/I ratio, as described in more detail above.

At decision block 310, a determination may be made as to whether the interference determined at block 308 is within acceptable limits, such that a cell site at the potential location having the determined radio propagation characteristics would provide acceptable performance and/or an acceptable level of interference with third-party signals. If so, then at decision block 312 a further determination may be made as to whether the interference would cause performance issues, such that some other potential location (e.g., one with less interference) may be preferable. If the determination at decision block 312 is that interference will not cause performance issues, then at block 314 the potential location may be identified as a "good" or more preferred potential location for a cell site. If the determinations at decision blocks 310 and 312 are that the interference will cause performance issues but is still within acceptable levels, then at block 316 the potential location may be identified as such (e.g., may be identified as an acceptable, but less preferred potential location for a cell site). For example, in some embodiments, the interference may be quantified in terms of a signal-to-interference ratio ("S/I ratio") that compares the strength of a signal transmitted by the wireless network operator to the relative strength of the third-party signals. An S/I ratio that exceeds 18 dB may then satisfy the determination at decision block 310, while an S/I ratio between 15 and 18 dB may only satisfy the determination at decision block 312, and an S/I ratio below 15 dB may satisfy neither decision block. In some embodiments, the determination at decision block 312 may include additional criteria, such as coverage requirements, capacity requirements, or vacate dates. For example, a cell site at the potential location may provide coverage to a geographic area with a high population density that is not otherwise covered by the wireless network operator. As a further example, the wireless network operator may consider the temporary nature of the interference during the transition period and decide that deploying a cell site at the location is preferable even if the site receives interference in the short term. Similarly, in some embodiments, the wireless network operator may schedule the deployment of a cell site at the location based on the vacate date of one or more interference sources. Placing a cell site at a location where interference causes performance issues may thus be desirable for other reasons.

If the determination at decision block 310 is that interference at the potential location exceeds acceptable limits, then at block 318 the potential location may be identified as unacceptable. In some embodiments, the designations at blocks 314, 316, and 318 may be associated with a timeframe (e.g., the portion of the transition period during which a particular third party is transmitting), and a different designation may be determined for a later portion of the transition period. In further embodiments, blocks 308-318 may be carried out iteratively for different time periods between the start and end of the transition period. In some embodiments, the designations at blocks 314, 316, and 318 may correspond to colors or shadings (e.g., green, yellow, and red) that are displayed in a user interface, such as the user interface 200 depicted in FIG. 2.

The routine 300 then continues at decision block 320, where a determination may be made as to whether all potential cell site locations have been processed. If not, then the routine 300 branches to block 304, where another unprocessed potential location may be selected, and the routine 300 may then iterate through blocks 304-320 until all potential locations have been processed. In some embodiments, the routine 300 may then branch to block 322, where a user interface (e.g., the example user interface 200) may be generated and displayed to show the potential locations and associated interference levels.

In some embodiments, the routine 300 may determine a set of potential cell site locations that satisfy various criteria with regard to coverage, capacity, and short-term and long-term interference relative to the transition period. In further embodiments, the routine 300 may determine a cell site deployment plan. For example, cell site construction schedules may be timed such that cell sites are ready to begin using the newly licensed spectrum band just as interference sources vacate the spectrum band. As a further example, a cell site deployment plan may be generated that identifies some cell site locations or configurations as short-term, and identifies other cell site locations or configurations as long-term. The wireless network operator may thus deploy an interim configuration that makes use of the newly licensed spectrum during the transition period, and then transition to a longer-term configuration as the third-party users vacate the spectrum.

In various embodiments, the blocks of routine 300 may be combined, omitted, or carried out in various orders. For example, block 306 may be carried out in a separate loop or a separate routine, such that the estimated propagation of a set of potential cell sites may be determined prior to obtaining information regarding third-party users of the newly licensed spectrum band. As a further example, a scoring algorithm may be used rather than assigning the potential locations to categories, such that a numerical value is determined for each potential cell site location that indicates the relative acceptability of the potential location. The routine 300 is thus understood to be illustrative and not limiting.

Figure 4:
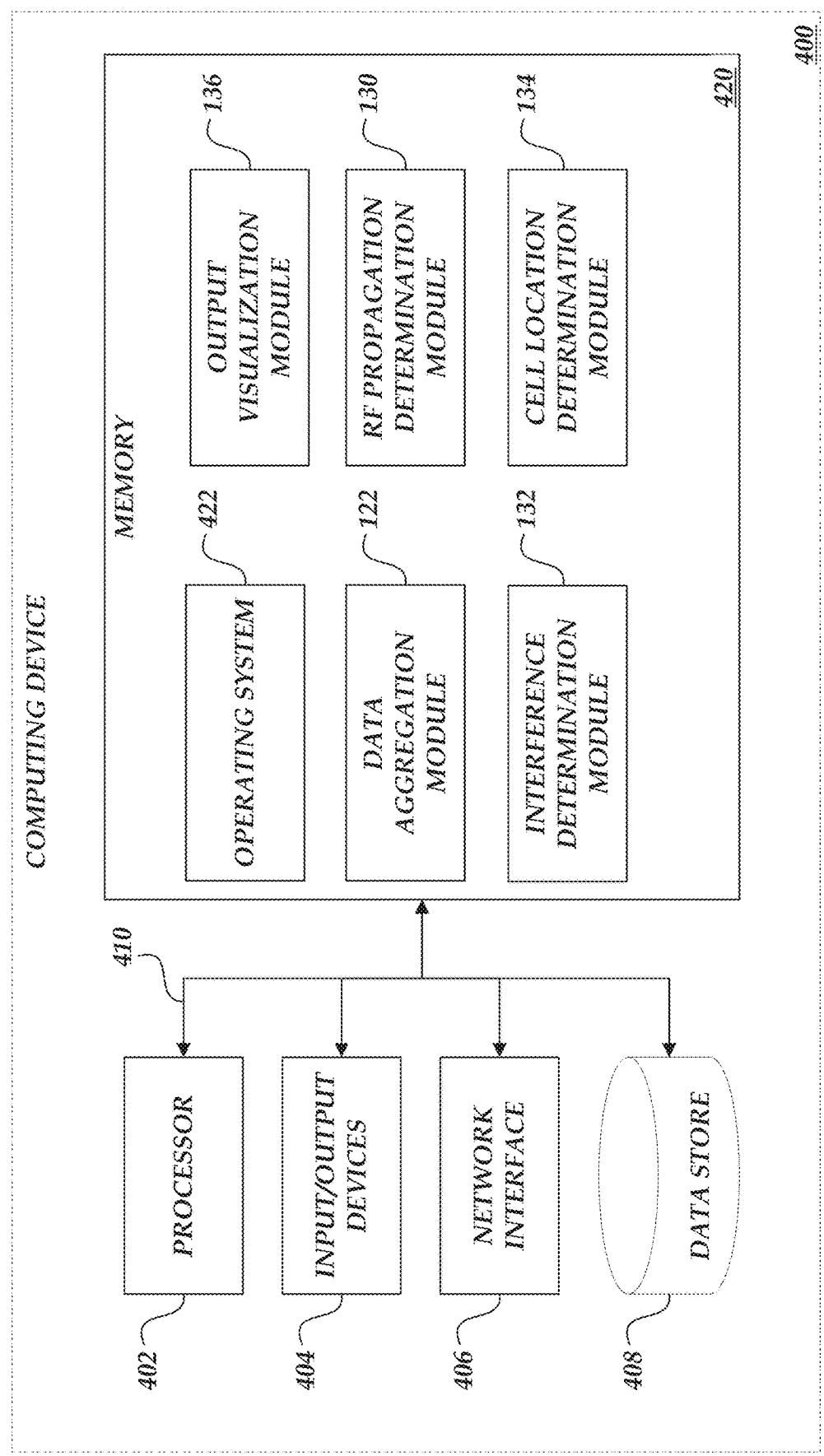
FIG. 4 is a functional block diagram of an example mobile device for implementing a spectrum band transition management system in accordance with aspects of the present disclosure.

FIG. 4 is an illustrative block diagram depicting a general architecture of a computing device 400, which includes an arrangement of computer hardware and software that may be used to implement aspects of the present disclosure. The computing device 400 may include more (or fewer) elements than those displayed in FIG. 4. It is not necessary, however, that all of these elements be shown in order to provide an enabling disclosure.

As illustrated, the computing device 400 includes a processor 402, input/output devices 404, a network interface 406, and a data store 408, all of which may communicate with one another by way of a communication bus 410. The network interface 406 may provide connectivity to one or more networks (such as the network 110 of FIG. 1) or computing systems and, as a result, may enable the computing device 400 to receive and send information and instructions from and to other computing systems or services.

The processor 402 may also communicate to and from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the computing device 400. The memory 420 may further store specific computer-executable instructions and other information (which may be referred to herein as "modules") for implementing aspects of the present disclosure.

In some embodiments, the memory 420 may include an output visualization module 136, which may be executed by the processor 402 to perform various operations, such as generating the user interface 200 described with reference to FIG. 2 above. The memory 420 may further include a data aggregation module 122, which may collect data from various sources as described above and store them in the data store 408 (or, in some embodiments, in external data stores such as the third-party on-air status data store 124, cell site data store 126, and detected interference data store 128). The memory 420 may still further include an RF propagation determination module 130, interference determination module 132, and cell location determination module 134, which may be executed by the processor 402 to perform various operations, such as carrying out blocks of the routine 300 depicted in FIG. 3.

While the operating system 422, output visualization module 136, data aggregation module 122, RF propagation determination module 130, interference determination module 132, and cell location determination module 134 are illustrated as distinct modules in the memory 420, in some embodiments, the output visualization module 136, data aggregation module 122, RF propagation determination module 130, interference determination module 132, and cell location determination module 134 may be incorporated as modules in the operating system 422 or another application or module, and as such, separate modules may not be required to implement some embodiments.

It will be recognized that many of the components described in FIG. 4 are optional and that embodiments of the computing device 400 may or may not combine components. Furthermore, components need not be distinct or discrete. Components may also be reorganized. For example, the computing device 400 may be represented in a single physical device or, alternatively, may be split into multiple physical devices. In some embodiments, components illustrated as part of the computing device 400 may additionally or alternatively be included in other computing devices, such that some aspects of the present disclosure may be performed by the computing device 400 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:
    a processor; and
    a data store in communication with the processor, wherein the data store is configured to store computer-executable instructions that, when executed by the processor, configure the processor to:
        obtain information regarding third-party wireless transmitters in a first geographic region, wherein each of the third-party wireless transmitters transmits on one or more radio frequencies within a licensed spectrum band during at least a portion of a transition period, the information including, for individual third-party wireless transmitters, a vacate date within the transition period by which the third-party wireless transmitter will cease transmitting within the licensed spectrum band in the first geographic region;
        determine, for each of the third-party wireless transmitters, an estimated propagation of radio signals from the third-party wireless transmitter;

for each of a plurality of candidate locations in the first geographic region:
  determine an estimated propagation of radio signals within the licensed spectrum band from a potential base station at the candidate location;
  determine a first predicted performance of the potential base station based at least in part on the estimated propagations of radio signals from the third-party wireless transmitters, the estimated propagation of radio signals from the potential base station, and one or more vacate dates, wherein the first predicted performance corresponds to a first date during the transition period;
  determine a second predicted performance of the potential base station based at least in part on the estimated propagations of radio signals from the third-party wireless transmitters, the estimated propagation of radio signals from the potential base station, and the one or more vacate dates, wherein the second predicted performance corresponds to a second date during the transition period; and
  cause display of a user interface including information regarding one or more predicted performances of potential base stations at one or more of the plurality of candidate locations, wherein the user interface enables display of at least the first predicted performance and the second predicted performance.

2. The system of claim 1, wherein the second date corresponds to at least one of the one or more vacate dates.

3. The system of claim 1, wherein the first predicted performance includes a predicted interference by a third-party wireless transmitter with the potential base station, or a predicted interference by the potential base station with a third-party wireless transmitter.

4. The system of claim 1, wherein the data store is configured to store further computer-executable instructions that, when executed by the processor, configure the processor to:
  determine a recommended location for a base station based at least in part on the predicted performances of potential base stations at individual locations of the plurality of candidate locations.

5. The system of claim 4, wherein the user interface includes information regarding the recommended location.

6. A computer-implemented method comprising:
  obtaining information regarding one or more third-party wireless transmitters, the information including, for each of the one or more third-party wireless transmitters, an estimated propagation of the third-party wireless transmitter and a vacate date by which the third-party wireless transmitter will cease transmitting within a licensed spectrum band;
  determining, for a candidate location, an estimated propagation of a potential base station at the candidate location, wherein the potential base station transmits within the licensed spectrum band;
  determining, based at least in part on the estimated propagations of the one or more third-party wireless transmitters and the potential base station, a predicted performance of the potential base station at the candidate location at each of a plurality of times; and
  displaying a user interface including information regarding the predicted performance of the potential base station at the candidate location at the plurality of times.

7. The computer-implemented method of claim 6 further comprising determining, based at least in part on the predicted performance of the potential base station at the candidate location at each of the plurality of times, that the candidate location is a recommended location for the potential base station.

8. The computer-implemented method of claim 6 further comprising determining, based at least in part on the predicted performance of the potential base station at the candidate location at each of the plurality of times, that the candidate location is an acceptable location for the potential base station.

9. The computer-implemented method of claim 6 further comprising determining, based at least in part on the predicted performance of the potential base station at the candidate location at each of the plurality of times, that the candidate location is not an acceptable location for the potential base station.

10. The computer-implemented method of claim 9, wherein determining that the candidate location is not an acceptable location comprises determining that the predicted performance of the potential base station at the candidate location at each of the plurality of times does not satisfy a performance criterion.

11. The computer-implemented method of claim 9, wherein determining that the candidate location is not an acceptable location comprises determining that the potential base station would cause unacceptable interference for at least one third-party wireless transmitter.

12. The computer-implemented method of claim 6, wherein the one or more third-party wireless transmitters comprise one or more UHF television stations.

13. The computer-implemented method of claim 6, wherein the one or more third-party wireless transmitters include an unlicensed transmitter.

14. The computer-implemented method of claim 13, wherein the unlicensed transmitter is a wireless microphone system.

15. The computer-implemented method of claim 6 further comprising determining, based at least in part on the estimated propagations of the one or more third-party wireless transmitters and the vacate dates of the one or more third-party wireless transmitters, a recommended set of base station locations.

16. The computer-implemented method of claim 6 further comprising determining, based at least in part on the estimated propagations of the one or more third-party wireless transmitters and the vacate dates of the one or more third-party wireless transmitters, a recommended configuration of one or more existing base stations.

17. The computer-implemented method of claim 16, wherein the recommended configuration includes deploying one or more radios before a first vacate date and activating the one or more radios after the first vacate date.

18. A non-transitory computer-readable medium storing computer-executable instructions that, when executed by a processor, configure the processor to perform operations including:
  obtaining, for each of one or more third-party wireless transmitters, an estimated propagation of the third-party wireless transmitter, wherein each of the one or more third-party wireless transmitters is associated with a vacate date by which it will cease transmitting within a licensed spectrum band;
  determining an estimated propagation of a potential base station transmitting within the licensed spectrum band at a candidate location;

determining, based at least in part on the estimated propagation of the potential base station and the estimated propagation at least one of the one or more third-party wireless transmitters, a predicted performance of the potential base station at the candidate location at one or more of a plurality of times; and displaying a user interface including information regarding the predicted performance of the potential base station at the candidate location at one or more of the plurality of times.

19. The non-transitory computer-readable medium of claim 18, wherein the predicted performance of the potential base station at the candidate location is determined based at least in part on an estimated interference level.

20. The non-transitory computer-readable medium of claim 18, wherein the user interface is configured to display estimated interference levels associated with individual third-party wireless transmitters at one or more of a plurality of times.

* * * * *